F. C. KARKALLA.
TROLLEY WHEEL.
APPLICATION FILED SEPT. 20, 1916.

1,326,063.  Patented Dec. 23, 1919.

Witnesses

Inventor
Frank C. Karkalla
By Victor J. Evans
Attorney

UNITED STATES PATENT OFFICE.

FRANK C. KARKALLA, OF FAIRHAVEN, PENNSYLVANIA.

TROLLEY-WHEEL.

1,326,063.  Specification of Letters Patent.  Patented Dec. 23, 1919.

Application filed September 20, 1916. Serial No. 121,259.

*To all whom it may concern:*

Be it known that I, FRANK C. KARKALLA, a citizen of the United States, residing at Fairhaven, in the county of Allegheny and State of Pennsylvania, have invented new and useful Improvements in Trolley-Wheels, of which the following is a specification.

This invention relates to a device by means of which a trolley wire will be automatically returned to the trolley wheel groove when once displaced, generally caused by going across a switch.

The primary object of the invention is to accomplish the foregoing result with a structure that can be manufactured at a minimum expense, and certain parts of which are capable of being connected to a new trolley wheel when a trolley wheel has worn out.

An object of the invention is the novel manner of associating the grooved members with a trolley wheel so that the trolley wheel can be quickly removed and a new wheel substituted.

Besides the above my invention is distinguished in the manner of associating the trolley wheel with the members and confining the same upon a shaft the latter having slight endwise movement by the use of suitably located leaf springs so as to take up the irregularities of the trolley wire. The leaf springs have the additional advantage of assuring a good electrical connection between the trolley replacer and the pole.

With these and other objects in view the invention will be better understood from the following detail description taken in connection with the accompanying drawing, wherein:—

Figure 1:
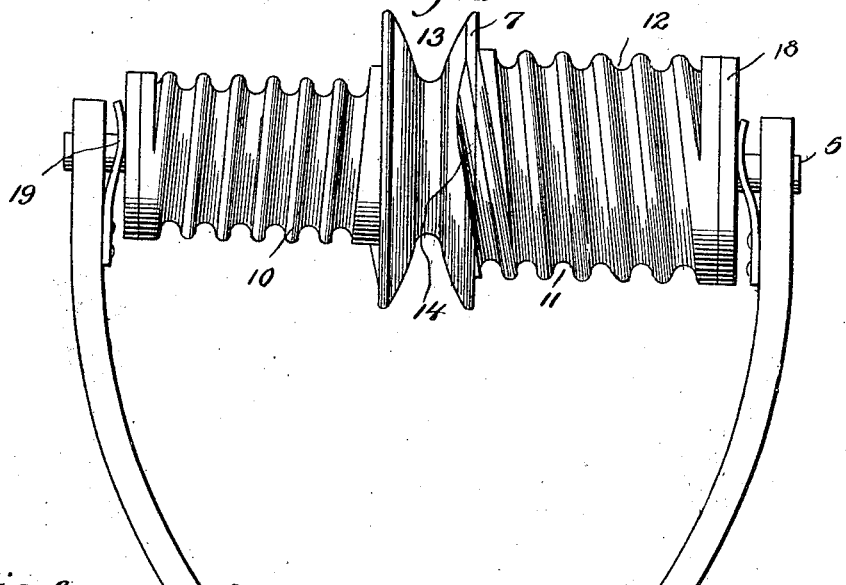
Figure 1, is a side elevation of the device.

Referring to the drawing the numeral 1, designates a trolley pole having a forked extremity the limbs 2 and 3 of which are formed with bearings 4. Rigidly mounted in the bearings 4 is a supporting element in the form of a shaft 5. At an intermediate point the shaft has formed thereon a collar 6.

A trolley wheel 7, of the well known construction has formed in its sides at spaced intervals slots 8, one wall 9 of which is inclined.

Each member is formed with a groove 12 for moving the trolley wire toward the groove 13 in the trolley wheel. The groove of the trolley wheel communicates with the groove of the member through an auxiliary groove 14 formed in the flange of the trolley wheel. Each replacing member has a flange 15 bearing upon the shaft and provided with lugs 16 having a wedging action with the slots 8.

At this point I wish to call attention to the fact that the flange of one member abuts the collar 6, while a washer 16 and a cotter pin 17 abuts the flange of the other member and holds the lugs seated in the slots 8.

To complete the invention the open ends of the members are closed by disks 18 and bearing upon the disks are leaf springs 19 that are in turn rigidly secured to the limbs 2 and 3 so as to assure a good electrical connection between the trolley and the pole.

I wish to call attention to the fact that although disks 18 are provided the same may be dispensed with and the springs 19 shaped to continuously bear upon the adjacent ends of the members.

From the foregoing description it will be seen that I provide a device in which certain parts can be used over and over again so as to mimimize the upkeep as it is well known in practice that the life of a trolley wheel is relatively short.

Figure 3:
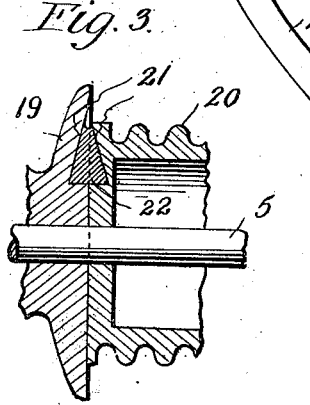
Fig. 3, is a detail view of a modified form of the invention.
Figure 2:
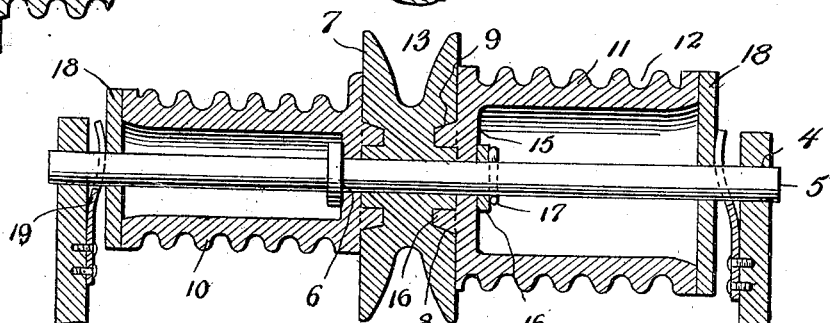
Fig. 2, is a longitudinal sectional view thereof.

For the purpose of assuring a perfect electrical connection between the trolley wheel and the members and dispensing with the machining of slots to receive the lugs I have shown in Fig. 3, the trolley wheel 19 as well as the member 20 formed part way around with an under cut slot 21 in which is deposited in a molten condition a fusible element 22 such as lead. The advantage of that form of my invention illustrated in Fig. 3, is that when the parts are to be disassociated heat is applied to the fusible element which causes the same to run out of the slots and allows the parts to be quickly separated. Besides this a good electrical connection between the elements is positive.

From the foregoing description taken in connection with the accompanying drawing it should be apparent that I provide a device which is admirably adapted for the purpose for which it is intended, that the device is simple, durable and efficient of construction and may be manufactured and sold at a comparatively low cost.

What I claim is:—

A trolley comprising a pole having a forked extremity, a shaft mounted therein, a pair of hollow spirally grooved members mounted upon the shaft, said members being open at one end and having their opposite ends closed, means located upon said shaft within each of said members and engageable with the inner face of the closed end of the latter to limit its longitudinal movement in one direction, a trolley wheel positioned between the closed end of the members to hold them in spaced relation, said wheel having grooved flanges registering with the grooves of the hollow members, interlocking lug and slot engagement between said members and trolley wheel to prevent relative rotary movement, and means for detachably connecting each of the members with the trolley wheel.

In testimony whereof I affix my signature.

FRANK C. KARKALLA.